Figure 1:
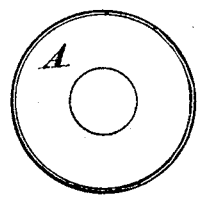
Figure 2:
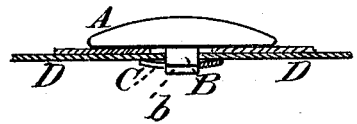
Figure 3:
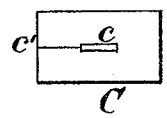
Figure 4:
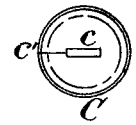

W. HOLLOWAY.
Button-Fastenings.

No. 140,627.  Patented July 8, 1873.

Witnesses.
Victor H. Becker
Amos W. Sangster

Inventor.
William Holloway.
per
Sangster & Becker
Atty's.

UNITED STATES PATENT OFFICE.

WILLIAM HOLLOWAY, OF BUFFALO, NEW YORK.

IMPROVEMENT IN BUTTON-FASTENINGS.

Specification forming part of Letters Patent No. 140,627, dated July 8, 1873; application filed March 8, 1873.

*To all whom it may concern:*

Be it known that I, WILLIAM HOLLOWAY, of the city of Buffalo, in the county of Erie and State of New York, have invented a new and Improved Button, of which the following is a specification:

This invention relates to that portion of an application for Letters Patent filed by me July 24, 1872, and which was decided by the office to be a distinct and separate invention, and was withdrawn therefrom December 28, 1872; and it consists in providing the button with a shank having its end enlarged, and a spring sheet-metal disk made slightly concave with a slotted hole and a slit cut therefrom, and in line with its length to one of its edges, or if it is round to its periphery.

Figure I is a plan view of the button. Fig. II is a sectional elevation thereof, showing the mode of its attachment to the garment. Fig. III is a plan view of the disk made in the form of a parallelogram. Fig. IV shows the disk made circular in form.

A is the button. B is its shank. $b$ is the enlarged portion on the end thereof. C is the spring-disk, having a slot, $c$, cut therein, and a slit, $c'$, leading therefrom to the periphery of the disk. D D are portions of the garment. The spring-disk C may be placed upon the shank with the convex side toward the button.

The operation is as follows: The shank of the button is inserted through holes in the garment, the slit $c'$ is forced open by pressure against the reduced portion of the shank, the shank once being inserted into the slit, is forced back into the slot $c$, and the springing nature of the material closes the slit and prevents the withdrawal of the shank.

I claim—

The combination of the concave spring-disk C, having a slot, $c$, and a slit, $c'$, extending therefrom to the edge or periphery of the disk, with the button A and shank B, all being constructed and operating substantially as described.

WILLIAM HOLLOWAY.

Witnesses:
   VICTOR H. BECKER,
   FRANK BAPST.